United States Patent Office.

GEORGE SANGER, OF BELOIT, WISCONSIN.

Letters Patent No. 92,652, dated July 13, 1869.

IMPROVED CHEMICAL OLIVE-SOAP.

The Schedule referred to in these Letters Patent and making part of the same.

*To all whom it may concern:*

Be it known that I, GEORGE SANGER, of Beloit, Rock county, in the State of Wisconsin, have invented certain new and useful Improvements in the Composition and Manufacture of Chemical Olive-Soap; and I do hereby declare the following description to be sufficient to enable any person skilled in the art or science to which it most nearly appertains, to make and use my said invention or improvements without further invention or experiment.

The nature of my invention and improvements consists in composition and mixture of ingredients in about the following proprotions herein named, and manufactured substantially in the manner below described, to wit:

Put into a steam soap-kettle one thousand pounds of tallow, then add alkaline lye, (made from soda-ash, or the like,) at twelve per cent., till you have about two barrels. Then start steam. Keep boiling and adding the lye till it is thoroughly made into soap. Then add three pecks of salt dissolved in water, as strong as you can make the pickle. Boil the whole for one hour; this will separate the soap from the spent lye. Then stop the steam for two hours; the soap will then rise to the top of the lye. Then draw the spent lye from the soap. Then add two barrels of good lye to the soap, fifteen per cent. Then put into the soap four hundred and fifty pounds of resin. Keep boiling and adding lye till the resin is thoroughly made into soap. Then add three pecks of salt dissolved in water, and boil one hour, which will separate the soap from the spent lye again. Stop steam again and let stand for three hours. Then draw the spent lye from the soap, and add two barrels of lye at fifteen per cent. Start steam again, and keep adding lye till the soap is so strong that it will take no more strength. Then add half bushel of salt dissolved in water. Boil one and one-half hour. Then stop steam, and let it stand for four hours. Then draw the lye and add one barrel of water. Start steam and keep boiling, adding till it is well mixed, which is called being finished in a settled state. Then stop steam, and let it stand over night. In the morning dip off into tubs, and add the following ingredients, to wit, two hundred and fifty pounds of sal-soda, sixty pounds of wheat flour, twelve pounds of ammonia, two pounds of salts of tartar, and one gallon of alcohol, and mix well until cool.

What I claim as my invention and improvements, and desire to secure by Letters Patent, is—

The soap consisting of the above-enumerated ingredients, in about the proportions set forth, and prepared substantially in the manner herein described and specified.

GEORGE SANGER.

Witnesses:
 H. P. JOHNSON,
 R. F. DUTTON.